United States Patent
Bandela et al.

(10) Patent No.: US 10,440,439 B2
(45) Date of Patent: Oct. 8, 2019

(54) METHOD AND APPARATUS FOR MEDIA CONTENT STREAMING AND REMINDER NOTIFICATIONS

(71) Applicant: THE DIRECTV GROUP, INC., El Segundo, CA (US)

(72) Inventors: Sudheer Bandela, Torrance, CA (US); Hai Nguyen, Torrance, CA (US); Binny Asarikuniyil, Cerritos, CA (US); Heather Truong, Anaheim, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/445,397

(22) Filed: Feb. 28, 2017

(65) Prior Publication Data

US 2018/0249222 A1   Aug. 30, 2018

(51) Int. Cl.
*H04N 7/18* (2006.01)
*H04N 21/488* (2011.01)
(Continued)

(52) U.S. Cl.
CPC ... *H04N 21/4882* (2013.01); *H04N 21/25808* (2013.01); *H04N 21/4126* (2013.01); *H04N 21/43615* (2013.01)

(58) Field of Classification Search
CPC ......... H04N 21/25808; H04N 21/4882; H04N 21/43615
(Continued)

(56) References Cited

U.S. PATENT DOCUMENTS 8,015,580 B2    9/2011 Poling, Jr. et al.
8,453,185 B2 *  5/2013 Bonfrer ............. H04N 7/17327
                                                   725/18
(Continued)

FOREIGN PATENT DOCUMENTS

WO    2003003724 A1    1/2003
WO    2003024107 A1    3/2003
(Continued)

OTHER PUBLICATIONS

EPGAnywhere/HbbTV, mediapress.tv, Jul. 10, 2014., 2014, pp. 1-2.
(Continued)

*Primary Examiner* — Nnenna N Ekpo
(74) *Attorney, Agent, or Firm* — Guntin & Gust, PLC; Douglas Schnabel

(57) ABSTRACT

Aspects of the subject disclosure may include, for example, registering a first mobile device of a subscriber as a first candidate device to receive a notification of a future streaming of a media content item; registering a second mobile device of the subscriber as a second candidate device to receive the notification of the future streaming of the media content item; determining first and second usage status of the first and second mobile devices; selecting, based upon the first usage status and the second usage status, one of the first and second mobile devices; sending to the selected mobile device a notification that the future streaming of the media content item will begin; receiving from the selected mobile device a streaming instruction to initiate streaming of the media content item; and streaming to the selected mobile device the media content item. Other embodiments are disclosed.

19 Claims, 13 Drawing Sheets

(51) Int. Cl.
*H04N 21/436* (2011.01)
*H04N 21/258* (2011.01)
*H04N 21/41* (2011.01)

(58) Field of Classification Search
USPC .................. 725/74, 38, 58, 61, 80, 88, 102
See application file for complete search history.

(56) References Cited

U.S. PATENT DOCUMENTS

| | | | |
|---|---|---|---|
| 8,473,984 B1* | 6/2013 | Harmon | H04N 21/41407 370/310 |
| 8,554,840 B1 | 10/2013 | Milgramm et al. | |
| 8,826,358 B2 | 9/2014 | Kirby et al. | |
| 8,904,455 B2 | 12/2014 | Krikorian | |
| 8,938,748 B1* | 1/2015 | Mirisola | H04H 60/32 725/10 |
| 8,958,019 B2 | 2/2015 | Williams et al. | |
| 8,984,559 B2 | 3/2015 | Kothari | |
| 9,003,451 B2 | 4/2015 | Boyer et al. | |
| 9,038,102 B1 | 5/2015 | Gopinath et al. | |
| 9,038,110 B2 | 5/2015 | Kvache | |
| 9,160,974 B2 | 10/2015 | Shah et al. | |
| 9,185,449 B2 | 11/2015 | Ellis | |
| 9,237,291 B2 | 1/2016 | Selim | |
| 9,258,617 B2 | 2/2016 | Karaoguz et al. | |
| 9,300,993 B2 | 3/2016 | Goergen et al. | |
| 9,307,281 B2 | 4/2016 | Bryant et al. | |
| 9,654,832 B1* | 5/2017 | Arunachalam | H04N 21/47214 |
| 2006/0248555 A1* | 11/2006 | Eldering | G06Q 30/0251 725/34 |
| 2008/0034081 A1* | 2/2008 | Marshall | G08C 17/02 709/223 |
| 2008/0163305 A1* | 7/2008 | Johnson | H04N 5/44543 725/58 |
| 2009/0150925 A1* | 6/2009 | Henderson | H04N 7/163 725/34 |
| 2009/0328101 A1 | 12/2009 | Suomela et al. | |
| 2010/0071007 A1* | 3/2010 | Meijer | H04N 5/782 725/58 |
| 2011/0016492 A1* | 1/2011 | Morita | H04N 5/44543 725/58 |
| 2011/0282759 A1 | 11/2011 | Levin et al. | |
| 2013/0247120 A1* | 9/2013 | Milgramm | H04N 21/2187 725/110 |
| 2015/0070585 A1 | 3/2015 | Sharif-Ahmadi et al. | |
| 2016/0073172 A1* | 3/2016 | Sharples | H04N 21/4126 725/53 |

FOREIGN PATENT DOCUMENTS

| | | |
|---|---|---|
| WO | 2011056348 A1 | 5/2011 |
| WO | 2014145976 A1 | 9/2014 |
| WO | 2016057519 | 4/2016 |

OTHER PUBLICATIONS

Bandela, Sudheer et al., U.S. Appl. No. 15/426,146, filed Feb. 7, 2017.
Bernhaupt, Regina et al., User interface guidelines for the control of interactive television systems via smart phone applications. Behaviour & Information Technology 33.8 (2014): 784799., 2014, pp. 1-18.
Ethan, How to Setup WatchOn to Control Your TV and Settopbox, Webcazine, webcazine.com, Aug. 22, 2013., pp. 1-12.
Martin, Reed et al., neXtream: a multidevice, social approach to video content consumption. Consumer Communications and Networking Conference (CCNC), 2010 7th IEEE. IEEE, 2010, pp. 1-6.

* cited by examiner

| SUN 1/1/2017 | 9:30am | 10:00am | 10:30am |
|---|---|---|---|
| Channel 1 | | Movie A [HD] (R) ⇒ | |
| Channel 2 | | Movie B [SD] (R) ⇒ | |
| Channel 3 | News [HD] (R) | Talk Show [HD] (R) ⇒ | |
| Channel 4 | | Football @ Miami [HD] (R) (S) ⇒ | |
| * * * | | | |
| Channel 20 | | Football @ New York [HD] (R) (S) ⇒ | |

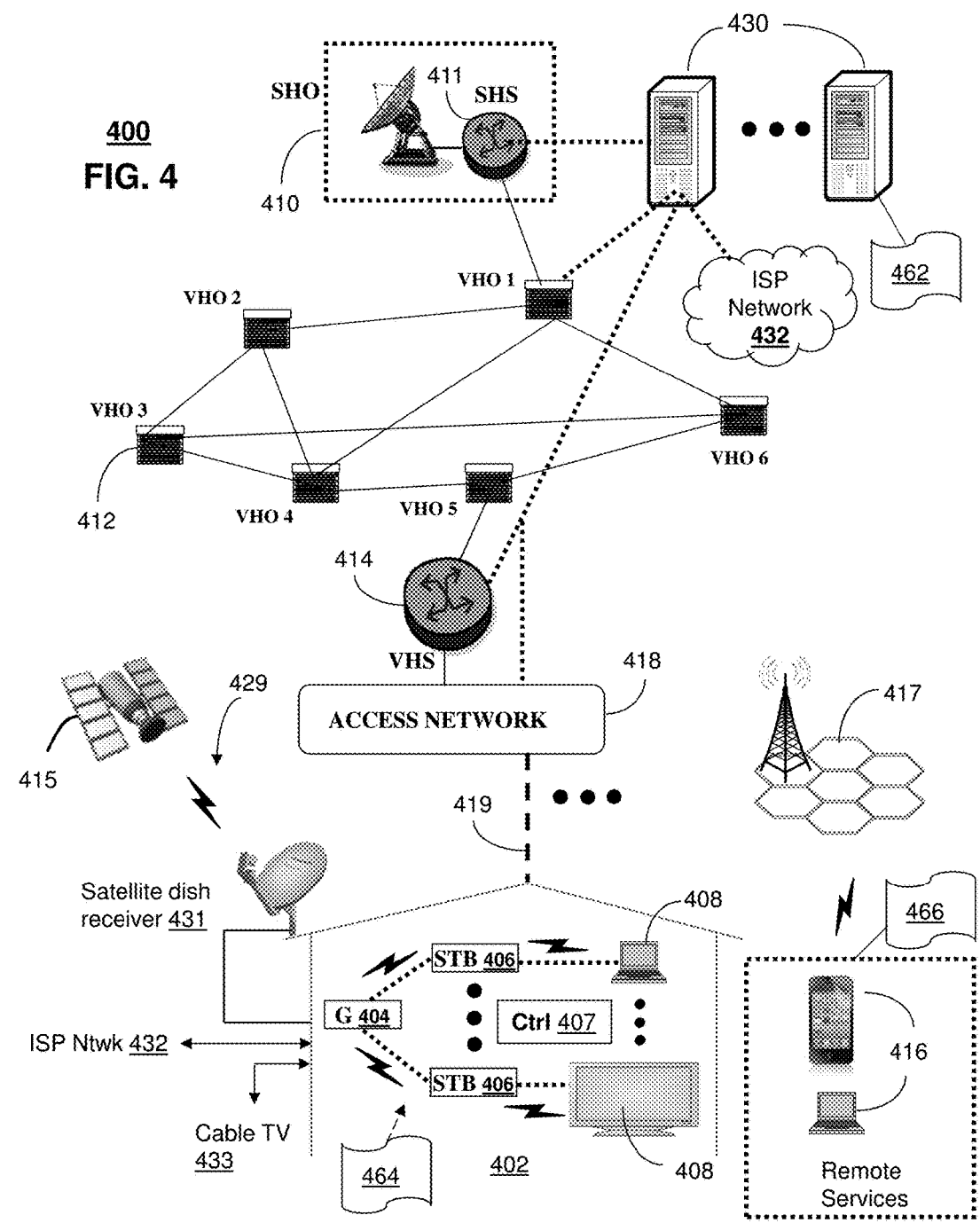

METHOD AND APPARATUS FOR MEDIA CONTENT STREAMING AND REMINDER NOTIFICATIONS

FIELD OF THE DISCLOSURE

The subject disclosure relates to a method and an apparatus for media content streaming and reminder notifications.

BACKGROUND

Various systems for streaming media content and delivering associated notifications have been provided.

BRIEF DESCRIPTION OF THE DRAWINGS

Reference will now be made to the accompanying drawings, which are not necessarily drawn to scale, and wherein:

FIG. 3A depicts an illustrative embodiment of a graphical user interface (sometimes referred to herein as "GUI") for media content streaming and reminder notifications;

FIG. 4 depicts an illustrative embodiment of a communication system that provides media services including streaming and reminder notifications as described in connection with the embodiments of FIGS. 1A-1B, 2A-2C and 3A-3E;

DETAILED DESCRIPTION

The subject disclosure describes, among other things, illustrative embodiments for media content streaming and reminder notifications. Other embodiments are described in the subject disclosure.

One or more aspects of the subject disclosure include mechanisms for sending a reminder notification (as well as a subsequent streaming of media content) to one of a plurality of mobile devices of a subscriber.

One or more aspects of the subject disclosure include mechanisms for sending a reminder notification to a mobile device of a subscriber and then streaming (responsive to an instruction from the mobile device) media content to a set-top box indicated by the subscriber.

One or more aspects of the subject disclosure include mechanisms for determining which one of a plurality of set-top boxes is in closer physical proximity to a mobile device of a subscriber and then streaming media content to the set-top box that is physically closer to the mobile device.

Various embodiments, techniques and/or mechanisms described herein may be utilized with (and/or combined with) the embodiments, techniques and/or mechanisms described in U.S. patent application Ser. No. 15/426,146, filed Feb. 7, 2017 (the entire contents of which are incorporated herein by reference).

Figure 1A:
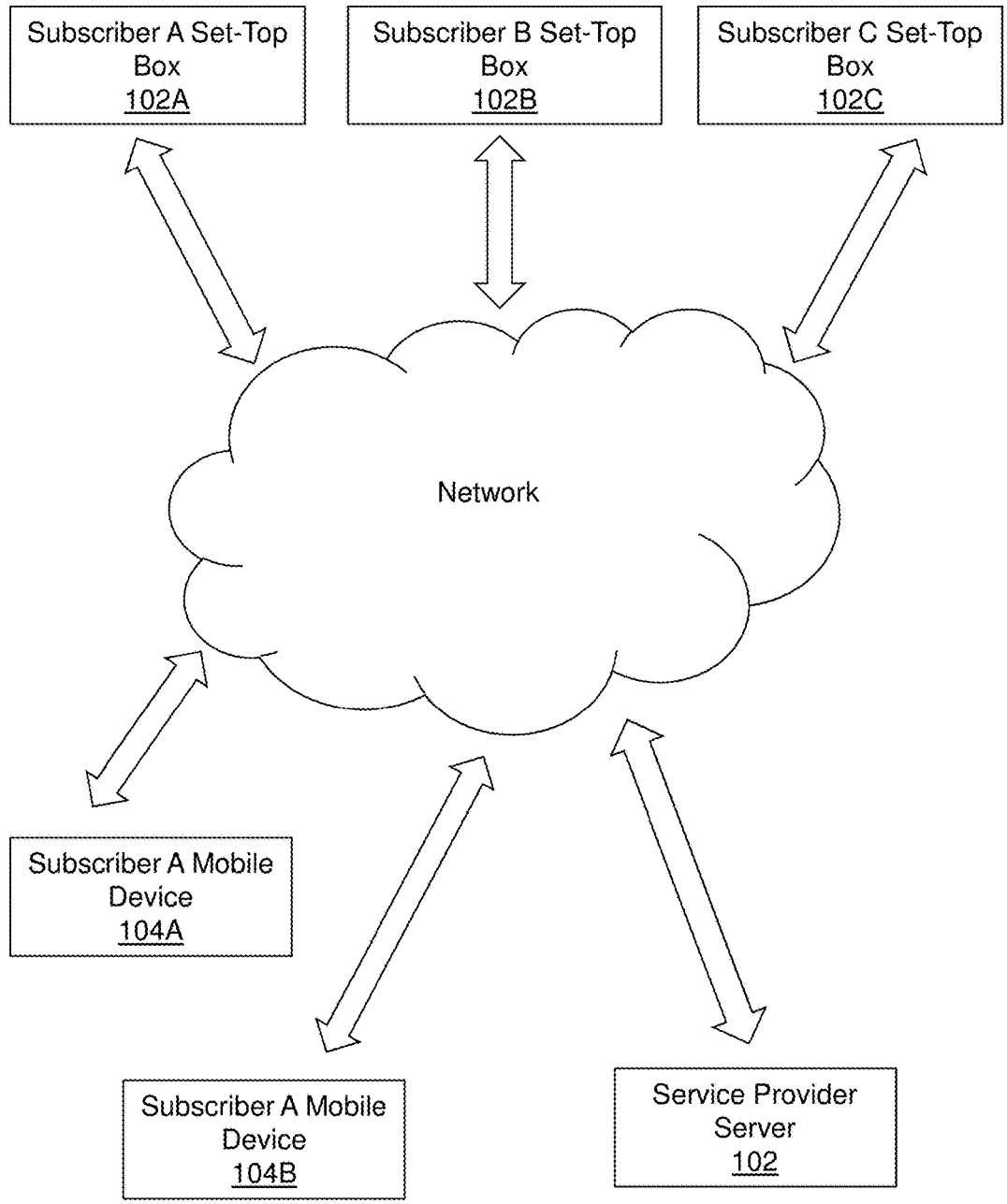
FIG. 1A depicts an illustrative embodiment of a system for media content streaming and reminder notifications.

FIG. 1A depicts an illustrative embodiment of a system 100 for media content streaming and reminder notifications. As seen in this FIG., a service provider server 102 is in bi-directional communication via a network (e.g., the Internet) with Subscriber A set-top box 102A, Subscriber B set-top box 102B, Subscriber C set-top box 102C, Subscriber A mobile device 104A and Subscriber A mobile device 104B. In one example, each of Subscriber A mobile device 104A and Subscriber A mobile device 104B comprises a smartphone, a smart watch, a tablet, a laptop computer, or any combination thereof. In another example, the service provider server 102 is operated by service provider that provides media content to each of Subscriber A, Subscriber B and Subscriber C. In one example, Subscriber A is a given person and each of Subscriber B and Subscriber C is a different person who is a friend or family of (or otherwise related to) Subscriber A.

In operation, Subscriber A (not shown) uses at Subscriber A set-top box 102A. As described in more detail below, Subscriber A may use a graphical user interface of Subscriber A set-top box to register various devices with the service provider server 102. In one example, Subscriber A may register each of Subscriber A mobile device 104A and Subscriber A mobile device 104B with service provider server 102. Such registration may comprise, for example, storage of identification information associated with Subscriber A mobile device 104A (e.g., telephone number, account number, serial number) and Subscriber A mobile device 104B (e.g., telephone number, account number, serial number). The identification information may be stored in one or more databases (not shown) accessible by service provider server 102. In another example, Subscriber A may register each of Subscriber B set-top box 102B and Subscriber C set-top box 102C with service provider server 102. Such registration may comprise, for example, storage of identification information associated with Subscriber B set-top box 102B (e.g., Subscriber B's name, Subscriber B's account number with the service provider, a serial number of Subscriber B's set-top box) and identification information associated with Subscriber C set-top box 102C (e.g., Subscriber C's name, Subscriber C's account number with the service provider, a serial number of Subscriber C's set-top box). The identification information may be stored in one or more databases (not shown) accessible by service provider server 102.

After such registration, Subscriber A may use the GUI of Subscriber A set-top box (as described in more detail below) to schedule streaming of a media content item (e.g., a live event). In one example, the media content item may be scheduled to be streamed to Subscriber A mobile device 104A and/or Subscriber A mobile device 104B. In another example, the media content item may be scheduled to be streamed to Subscriber B set-top box 102B and/or Subscriber C set-top box 102C.

Figure 1B:
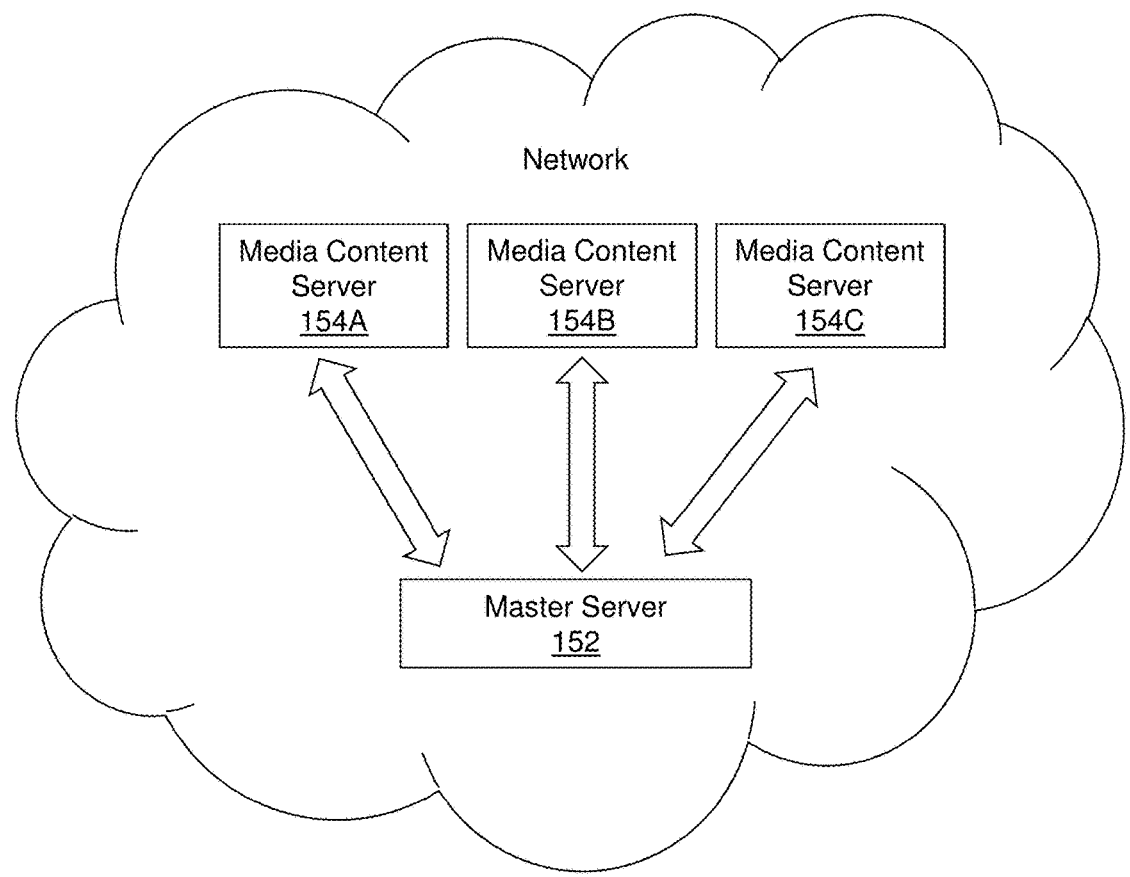
FIG. 1B depicts an illustrative embodiment of a system for media content streaming and reminder notifications.

Referring now to FIG. 1B, this FIG. depicts an illustrative embodiment of a system 150 for providing access (e.g., streaming access and/or downloadable access) to media content. As seen, master server 152 is in bidirectional communication (through the network) with media content server 154A, media content server 154B and media content server 154C. While three media content servers are shown in this example, any desired number of media content servers may be used. Master server 152 may cause or direct any of media content servers 154A, 154B and 154C to provide media content (e.g., provide media content to Subscriber A mobile device 104A, Subscriber A mobile device 104B, Subscriber A set-top box 102A, Subscriber B set-top box 102B and/or Subscriber C set-top box 102C).

Figure 2A:
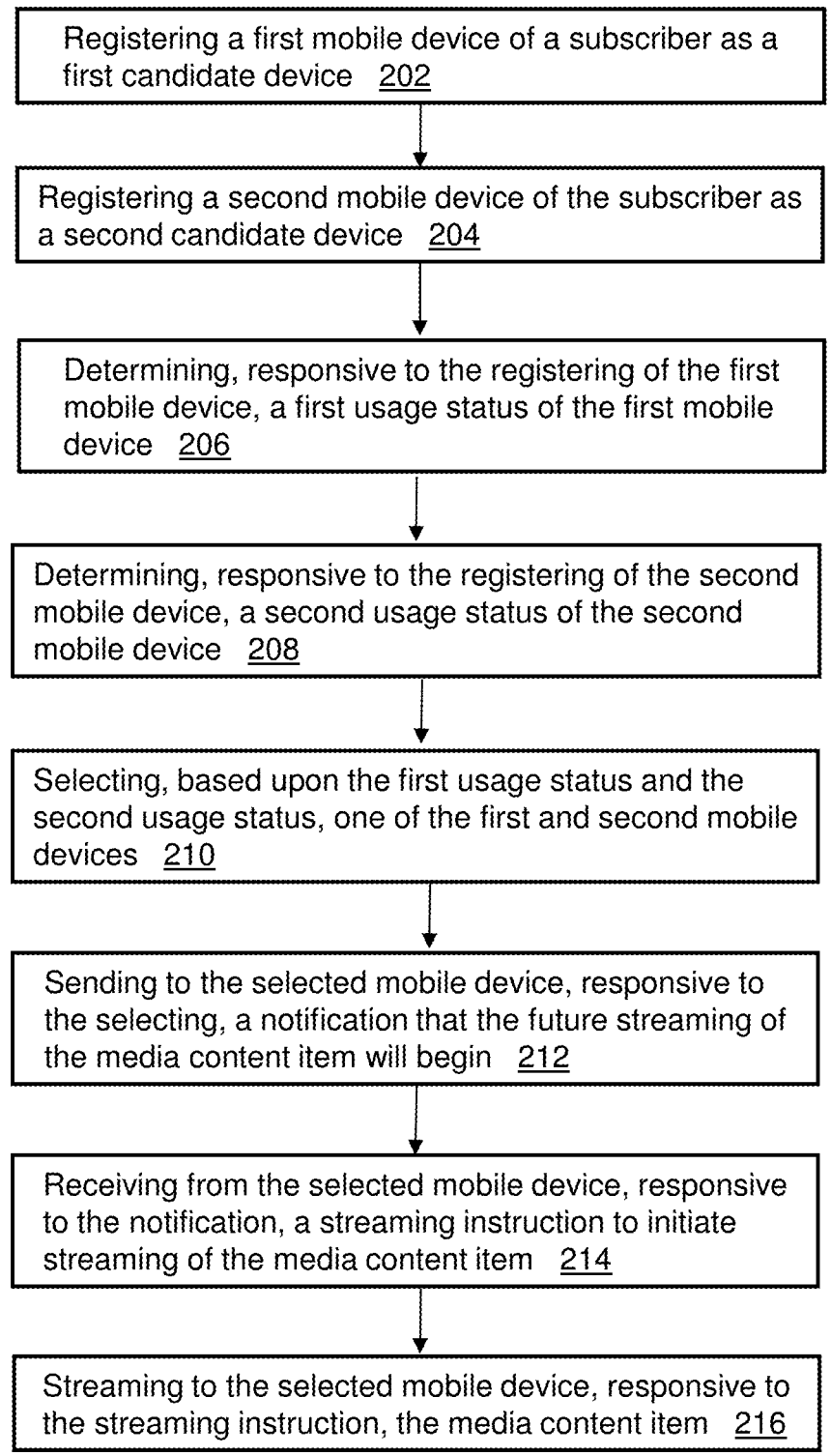
FIG. 2A depicts an illustrative embodiment of a method used in portions of the systems described in FIGS. 1A and 1B.

FIG. 2A depicts an illustrative embodiment of a method used by system 100 of FIG. 1A and/or system 150 of FIG. 1B. While for purposes of simplicity of explanation, the respective processes are shown and described as a series of blocks in FIG. 2A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2A, method 200 begins at step 202 with registering a first mobile device of a subscriber as a first candidate device to receive a notification of a future streaming of a media content item. Method 200 then continues to step 204 with registering a second mobile device of the subscriber as a second candidate device to receive the notification of the future streaming of the media content item. In one example, the registering may be performed using a GUI of a set-top box of the subscriber. In one specific example, the set-top box of the subscriber may be located where the subscriber lives (e.g., a house, an apartment, a dorm room).

Method 200 then continues to step 206 with determining, responsive to the registering of the first mobile device, a first usage status of the first mobile device, wherein the first usage status is indicative of whether the first mobile device is currently being used. In one example, the determining the first usage status may be performed at a time shortly before the future streaming is to begin. In another example, the determining the first usage status may be performed at a time shortly before the notification of the future streaming is sent. In another example, the determining the first usage status may be performed at a time specified by Subscriber A (e.g., at a time specified by Subscriber A when registering the first mobile device or at a time specified by Subscriber A when scheduling the future streaming). In another example, the first usage status indicates a most recent time that a first user interface of the first mobile device has been utilized. In one specific example, the most recent time that the first user interface of the first mobile device has been utilized may be determined by a query/response technique, in which a service provider server sends a query to the first mobile device asking for the information and the first mobile device sends back a response to the service provider server (wherein the response includes the requested information). In another specific example, the service provider server may periodically send the query to the first mobile device. In another specific example, the most recent time that the first user interface of the first mobile device has been utilized may be determined by an asynchronous technique. For instance, the first mobile device may periodically send the information to the service provider server (without being requested by the service provider server) or the first mobile device may send the information to the service provider server (without being requested by the service provider server) when a usage condition at the first mobile device changes.

Method 200 then continues to step 208 with determining, responsive to the registering of the second mobile device, a second usage status of the second mobile device, wherein the second usage status is indicative of whether the second mobile device is currently being used. In one example, the determining the second usage status may be performed at a time shortly before the future streaming is to begin (e.g., at essentially the same time that the determining of the first usage status is performed). In another example, the determining the second usage status may be performed at a time shortly before the notification of the future streaming is sent (e.g., at essentially the same time that the determining of the first usage status is performed). In another example, the determining the second usage status may be performed at a time specified by Subscriber A (e.g., at a time specified by Subscriber A when registering the second mobile device or at a time specified by Subscriber A when scheduling the future streaming). In another example, the second usage status indicates a most recent time that a second user interface of the second mobile device has been utilized. In one specific example, the most recent time that the second user interface of the second mobile device has been utilized may be determined by a query/response technique, in which a service provider server sends a query to the second mobile device asking for the information and the second mobile device sends back a response to the service provider server (wherein the response includes the requested information). In another specific example, the service provider server may periodically send the query to the second mobile device. In another specific example, the most recent time that the second user interface of the second mobile device has been utilized may be determined by an asynchronous technique. For instance, the second mobile device may periodically send the information to the service provider server (without being requested by the service provider server) or the second mobile device may send the information to the service provider server (without being requested by the service provider server) when a usage condition at the second mobile device changes.

Method 200 then continues to step 210 with selecting, based upon the first usage status and the second usage status, one of the first and second mobile devices, resulting in a selected mobile device. In one example, the first mobile device is selected as the selected mobile device in a case that the first mobile device had been the most recently used and the second mobile device is selected as the selected mobile device in a case that the second mobile device had been the most recently used.

Method 200 then continues to step 212 with sending to the selected mobile device, responsive to the selecting, a notification that the future streaming of the media content item will begin. In one example, the notification is sent at a time indicated by the subscriber when scheduling the streaming. In one specific example, the time may be input by the subscriber via a GUI of the subscriber's set-top box. In another specific example, the time may be indicated as an absolute time (e.g., Tuesday, Jan. 3, 2017 at 9:00 pm). In another specific example, the time may be indicated as a relative time (e.g., 15 minutes before the streaming is scheduled to begin). Method 200 then continues to step 214 with receiving from the selected mobile device, responsive to the notification, a streaming instruction to initiate streaming of the media content item. In one example, the streaming instruction may be sent from the selected mobile device via the subscriber providing input to a GUI of the selected mobile device. Method 200 then continues to step 216 with streaming to the selected mobile device, responsive to the streaming instruction, the media content item. The selected mobile device may then present to the subscriber (e.g., via a display) the media content being streamed to the selected mobile device.

Figure 2B:
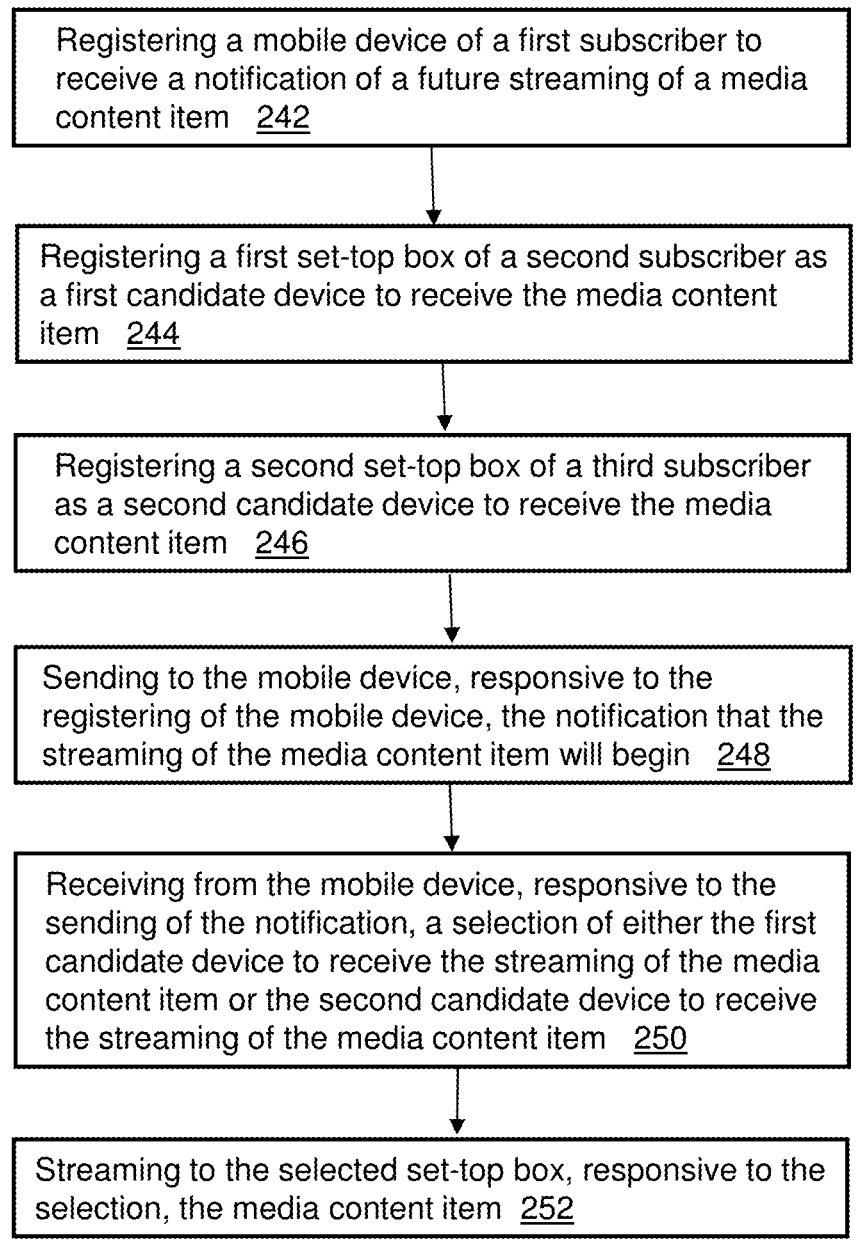
FIG. 2B depicts an illustrative embodiment of a method used in portions of the systems described in FIGS. 1A and 1B.

FIG. 2B depicts an illustrative embodiment of a method used by system 100 of FIG. 1A and/or system 150 of FIG. 1B. While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2B, method 240 begins at step 242 with registering a mobile device of a first subscriber to receive a notification of a future streaming of a media content item. Method 240 then continues to step 244 with registering a first set-top box of a second subscriber as a first candidate device to receive the media content item, wherein the second subscriber is distinct from the first subscriber. Method 240 then continues to step 246 with registering a second set-top box of a third subscriber as a second candidate device to receive the media content item, wherein the third subscriber is distinct from the first subscriber, and wherein the third subscriber is distinct from the second subscriber. In one example, the registering may be performed using a GUI of a set-top box of the first subscriber. In one specific example, the set-top box of the first subscriber may be located where the first subscriber lives (e.g., a house, an apartment, a dorm room).

Method 240 then continues to step 248 with sending to the mobile device, responsive to the registering of the mobile device, the notification that the streaming of the media content item will begin. In one example, the notification is sent at a time indicated by the first subscriber when scheduling the streaming. In one specific example, the time may be input by the first subscriber via a GUI of the first subscriber's set-top box. In another specific example, the time may be indicated as an absolute time (e.g., Tuesday, Jan. 3, 2017 at 9:00 pm). In another specific example, the time may be indicated as a relative time (e.g., 15 minutes before the streaming is scheduled to begin).

Method 240 then continues to step 250 with receiving from the mobile device, responsive to the sending of the notification, a selection of either the first candidate device to receive the streaming of the media content item or the second candidate device to receive the streaming of the media content item, wherein the selecting results in a selected set-top box. In one example, the selection may be sent from the mobile device via the first subscriber providing input to a GUI of the mobile device. Method 240 then continues to step 252 with streaming to the selected set-top box, responsive to the selection, the media content item. The selected set-top box may then present (e.g., via a display associated with the selected set-top box) the media content being streamed to the selected set-top box.

In one embodiment, prior to streaming the media content item to the selected set-top box, a replacement subscription profile associated with the first subscriber is transmitted to the selected set-top box (e.g., transmitted from a service provider server). In one example, the replacement subscription profile enables the selected set-top box to present the media content item that is streamed to the selected set-top box. In another specific example, the replacement subscription profile replaces (e.g., temporarily replaces), on the selected set-top box, an existing subscription profile (e.g., a replacement profile transmitted to the set-top box of the second subscriber temporarily replaces an existing profile associated with the second subscriber or a replacement profile transmitted to the set-top box of the third subscriber temporarily replaces an existing profile associated with the third subscriber).

Figure 2C:
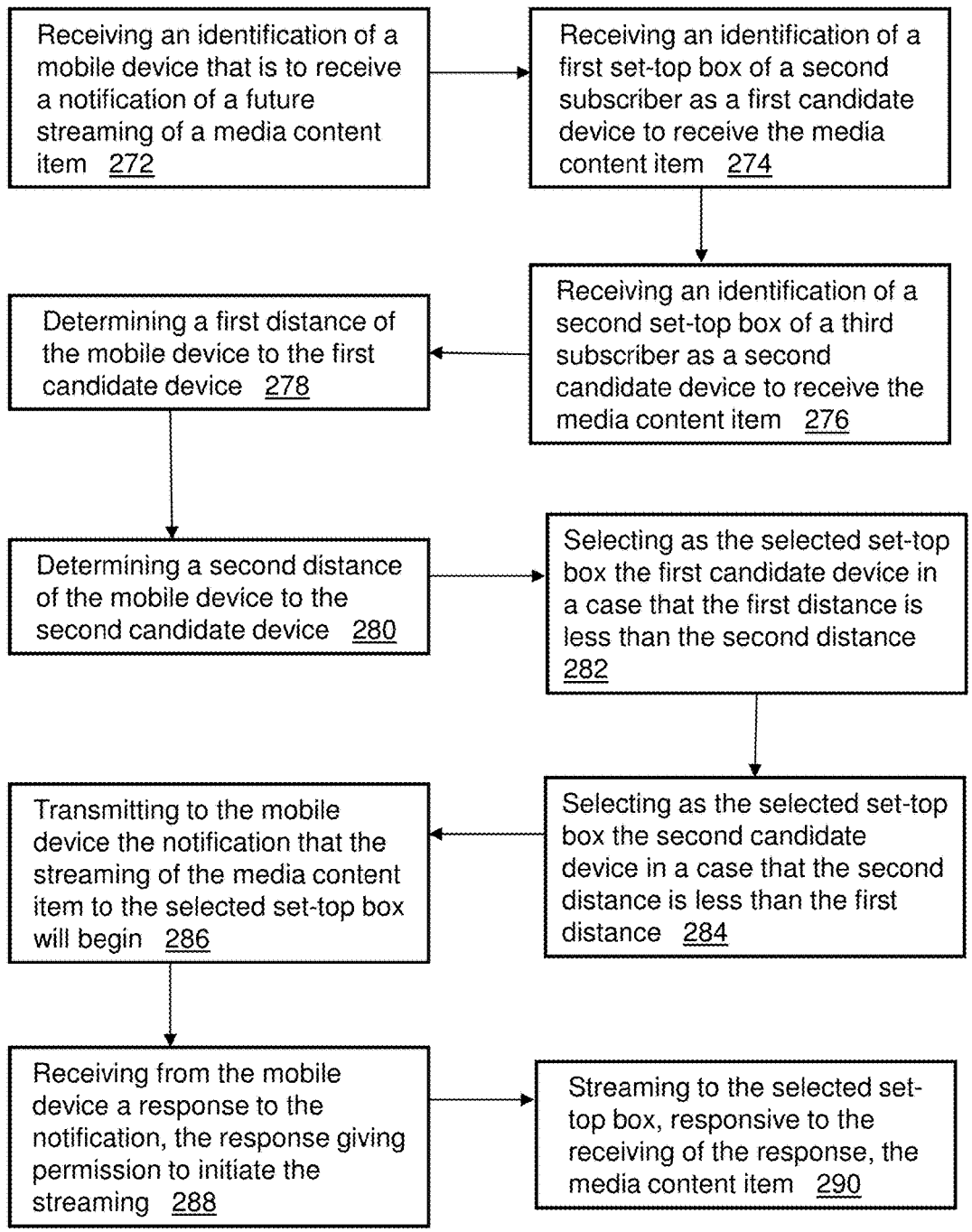
FIG. 2C depicts an illustrative embodiment of a method used in portions of the systems described in FIGS. 1A and 1B.

FIG. 2C depicts an illustrative embodiment of a method used by system 100 of FIG. 1A and/or system 150 of FIG. 1B. While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2C, method 270 begins at step 272 with receiving an identification of a mobile device that is to receive a notification of a future streaming of a media content item, the mobile device being associated with a first subscriber. Method 270 then continues to step 274 with receiving an identification of a first set-top box of a second subscriber as a first candidate device to receive the media content item, wherein the second subscriber is distinct from the first subscriber. Method 270 then continues to step 276 with receiving an identification of a second set-top box of a third subscriber as a second candidate device to receive the media content item, wherein the third subscriber is distinct from the first subscriber, and wherein the third subscriber is distinct from the second subscriber. In one example, the receiving steps 272, 274 and 276 may be performed using a GUI of a set-top box of the first subscriber. In one specific example, the set-top box of the first subscriber may be located where the first subscriber lives (e.g., a house, an apartment, a dorm room).

Method 270 then continues to step 278 with determining a first distance of the mobile device to the first candidate device. In one example, the determining the first distance may be performed at a time shortly before the future streaming is to begin. In another example, the determining the first distance may be performed at a time shortly before the notification of the future streaming is sent. In another example, the determining the first distance may be performed at a time specified by the first subscriber (e.g., at a time specified by the first subscriber when identifying the mobile device (and/or when identifying the first set-top box and/or the second set top-box) or at a time specified by the first subscriber when scheduling the future streaming). In one specific example, the first distance may be determined by a query/response technique, in which a service provider server sends a query to the mobile device asking for location information, the mobile device sends back a response to the service provider server (wherein the response includes the requested location information) and the service provider server compares the location information (from the mobile device) with a location of the first set-top box (the location of the first set-top box may be obtained, for example, from a database of installed locations or the like). In another specific example, the service provider server may periodically send the query to the mobile device. In another specific example, the first distance may be determined by an asynchronous technique. For instance, the mobile device may periodically send the location information to the service provider server (without being requested by the service provider server) or the mobile device may send the information to the service provider server (without being requested by the service provider server) when the mobile device is at a particular location.

Method 270 then continues to step 280 with determining a second distance of the mobile device to the second candidate device. In one example, the determining the second distance may be performed at a time shortly before the future streaming is to begin (e.g., at essentially the same time that the determining of the first distance is performed). In another example, the determining the second distance may be performed at a time shortly before the notification of the future streaming is sent (e.g., at essentially the same time that the determining of the first distance is performed). In another example, the determining the second distance may be performed at a time specified by the first subscriber (e.g., at a time specified by the first subscriber when identifying the mobile device (and/or when identifying the first set-top box and/or the second set top-box) or at a time specified by the first subscriber when scheduling the future streaming). In one specific example, the second distance may be determined by a query/response technique, in which a service provider server sends a query to the mobile device asking for location information, the mobile device sends back a response to the service provider server (wherein the response includes the requested location information) and the service provider server compares the location information (from the mobile device) with a location of the second set-top box (the location of the second set-top box may be obtained, for example, from a database of installed locations or the like). In another specific example, the service provider server may periodically send the query to the mobile device. In another specific example, the second distance may be determined by an asynchronous technique. For instance, the mobile device may periodically send the location information to the service provider server (without being requested by the service provider server) or the mobile device may send the information to the service provider server (without being requested by the service provider server) when the mobile device is at a particular location.

Method 270 then continues to step 282 with selecting as the selected set-top box the first candidate device in a case that the first distance is less than the second distance. Method 270 then continues to step 284 with selecting as the selected set-top box the second candidate device in a case that the second distance is less than the first distance. That is, in this example, whichever of the first set-top box and the second set-top box is in closer physical proximity to the mobile device is selected as the set-top box to receive the streaming media content.

Method 270 then continues to step 286 with transmitting to the mobile device the notification that the streaming of the media content item to the selected set-top box will begin. Method 270 then continues to step 288 with receiving from the mobile device a response to the notification, the response giving permission to initiate the streaming. In one example, the response giving permission to initiate the streaming may be sent from the mobile device via the subscriber providing input to a GUI of the mobile device.

Method 270 then continues to step 290 with streaming to the selected set-top box, responsive to the receiving of the response, the media content item. The selected set-top box may then present (e.g., via a display associated with the selected set-top box) the media content being streamed to the selected set-top box.

In one embodiment, prior to streaming the media content item to the selected set-top box, a replacement subscription profile associated with the first subscriber is transmitted to the selected set-top box (e.g., transmitted from a service provider server). In one example, the replacement subscription profile enables the selected set-top box to present the media content item that is streamed to the selected set-top box. In another specific example, the replacement subscription profile replaces (e.g., temporarily replaces), on the selected set-top box, an existing subscription profile (e.g., a replacement profile transmitted to the set-top box of the second subscriber temporarily replaces an existing profile associated with the second subscriber or a replacement profile transmitted to the set-top box of the third subscriber temporarily replaces an existing profile associated with the third subscriber).

FIG. 3A depicts an illustrative embodiment of a graphical user interface for media content streaming and reminder notifications. As seen in this FIG., graphical user interface 300 is presented. Graphical user interface 300 may comprise an electronic programming guide (sometimes referred to herein as "EPG") or the like. As seen, various channels are displayed along with associated content. Various indicators such as "HD" (corresponding to high-definition) and "SD" (corresponding to standard definition) are provided. Also provided are user input elements (e.g., buttons or the like) for scheduling a recording (see the buttons labelled "R") and/or for scheduling a streaming (see the buttons labelled "S"). The "R" buttons may be used for scheduling of media content recording as described herein. The "S" buttons may be used for scheduling of media content streaming as described herein. In one specific example, the "S" button 302 may be used to schedule streaming of the football game at Miami—resulting in an end user device notification GUI such as shown in one of FIGS. 3C, 3D and/or 3E. In another specific example, the scheduling of the media content streaming may include receiving from a user an indication of how much time ahead of the streaming (e.g., the streaming of a live event such as a sporting event, a concert, or other event) a notification should be sent to the user.

Figure 3B:
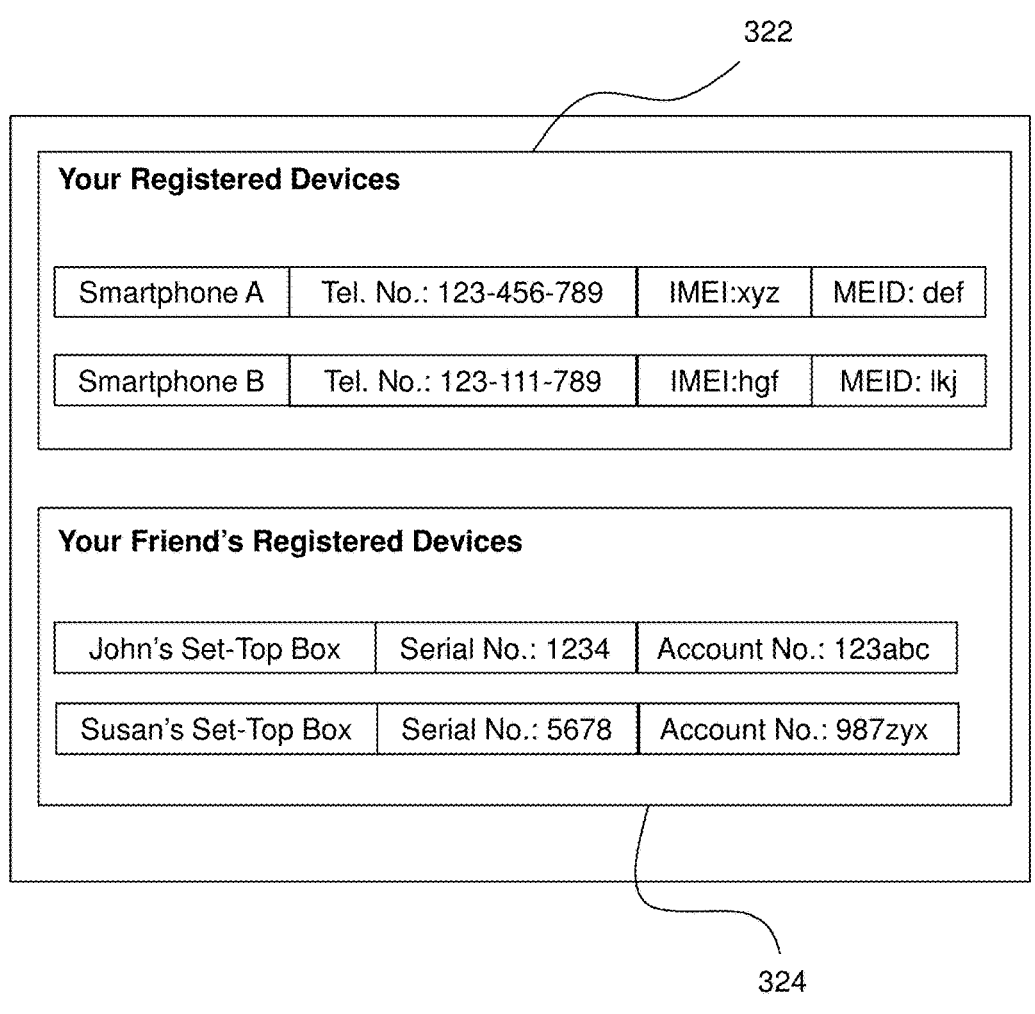
FIG. 3B depicts an illustrative embodiment of a graphical user interface for media content streaming and reminder notifications.

FIG. 3B depicts an illustrative embodiment of a graphical user interface for media content streaming and reminder notifications. As seen in this FIG., graphical user interface 320 is presented (e.g., on a display associated with a set-top box of a subscriber). Graphical user interface 320 may include section 322, associated with a subscriber's registered devices. Further, graphical user interface 320 may include section 324, associated with registered devices of a subscriber's friends (of course, this section 324 could be associated with family members of the subscriber, work associates of the subscriber, and/or any other people related to the subscriber).

Still referring to FIG. 3B, section 322 may be configured to receive input (e.g., from the subscriber) directed to addition of devices(s), deletion of device(s), and/or editing of device specifics (including, for example, a name of a device and/or an identifier of a device such as, in the case of a smartphone, a telephone number, an IMEI number (International Mobile Equipment Identity number) and/or an MEID number (Mobile Equipment Identifier number)). In another example, a network address of a device may be input and/or stored in a database. Of course, while two devices are shown in section 322, any number (and type) of devices may be utilized. In another example, some or all of the information in section 322 may be automatically populated (e.g., via lookup at one or more databases by a service provider server).

Still referring to FIG. 3B, section 324 may be configured to receive input (e.g., from the subscriber) directed to addition of devices(s), deletion of device(s), and/or editing of device specifics (including, for example, a name of a device, a subscriber account number, and/or an identifier of a device such as, in the case of a set-top box, a serial number). In another example, a network address of a device may be input and/or stored in a database. Of course, while two devices are shown in section 324, any number (and type) of devices may be utilized. In another example, some or all of the information in section 324 may be automatically populated (e.g., via lookup at one or more databases by a service provider server).

Figure 3C:
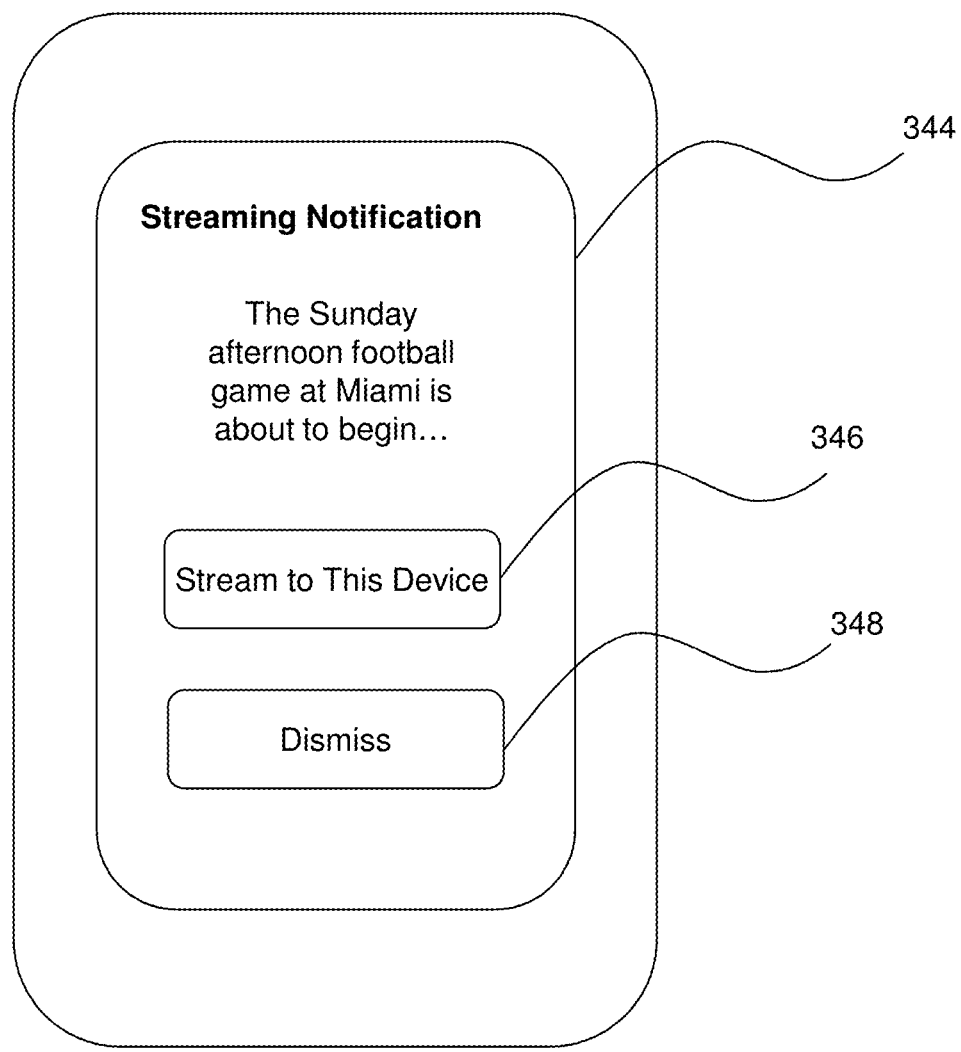
FIG. 3C depicts an illustrative embodiment of an end user device with a graphical user interface for media content streaming and reminder notifications.

FIG. 3C depicts an illustrative embodiment of an end user device with a graphical user interface for media content streaming and reminder notifications. As seen in this FIG., an end user device 340 (such as, for example, a smartphone) includes a display upon which graphical user interface 344 is presented. Graphical user interface 344 may include input element 346 (such as a button or the like) to cause media content to be streamed to the device. Further, graphical user interface 344 may include input element 348 (such as a button or the like) to dismiss the notification (without causing media content to be streamed to the device).

Figure 3D:
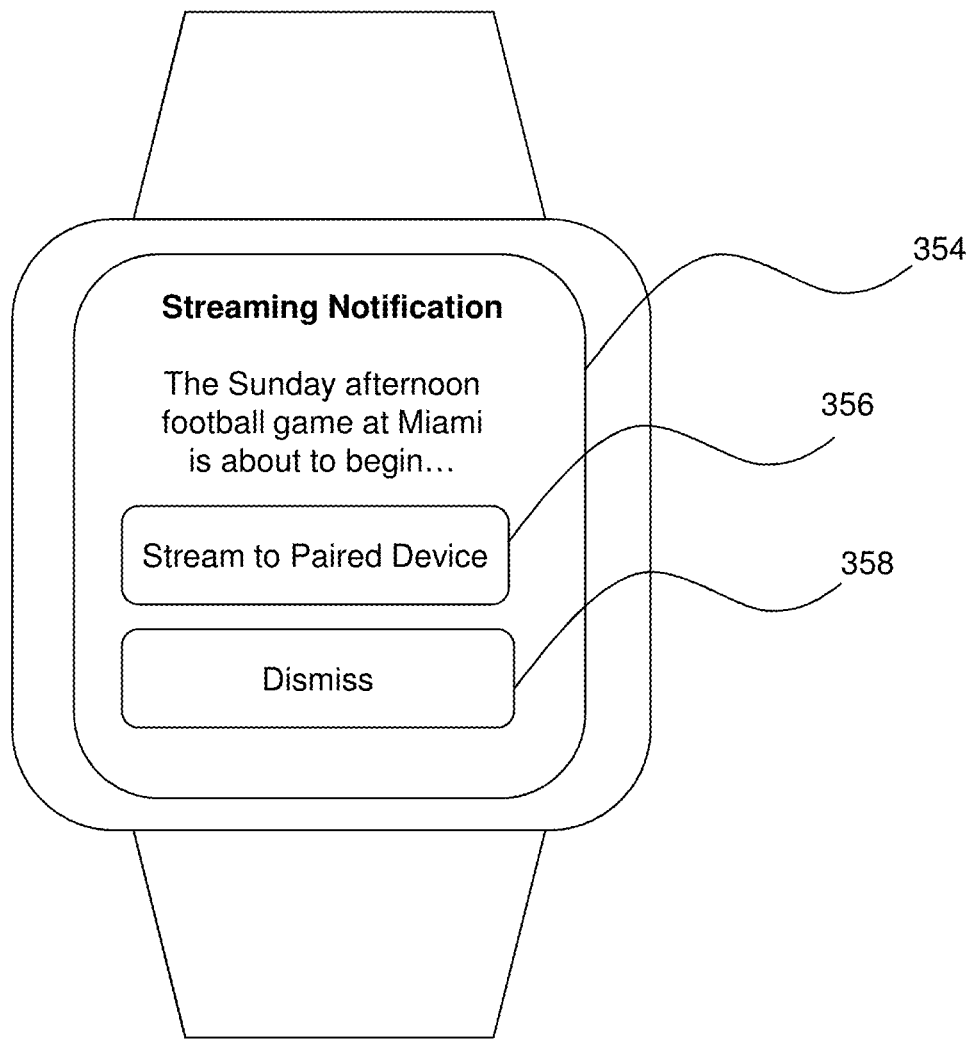
FIG. 3D depicts an illustrative embodiment of an end user device with a graphical user interface for media content streaming and reminder notifications.

FIG. 3D depicts an illustrative embodiment of an end user device with a graphical user interface for media content streaming and reminder notifications. As seen in this FIG., an end user device 350 (such as, for example, a smart watch) includes a display upon which graphical user interface 354 is presented. Graphical user interface 354 may include input element 356 (such as a button or the like) to cause media content to be streamed to a paired device (not shown). Further, graphical user interface 354 may include input element 358 (such as a button or the like) to dismiss the notification (without causing media content to be streamed to the paired device).

Figure 3E:
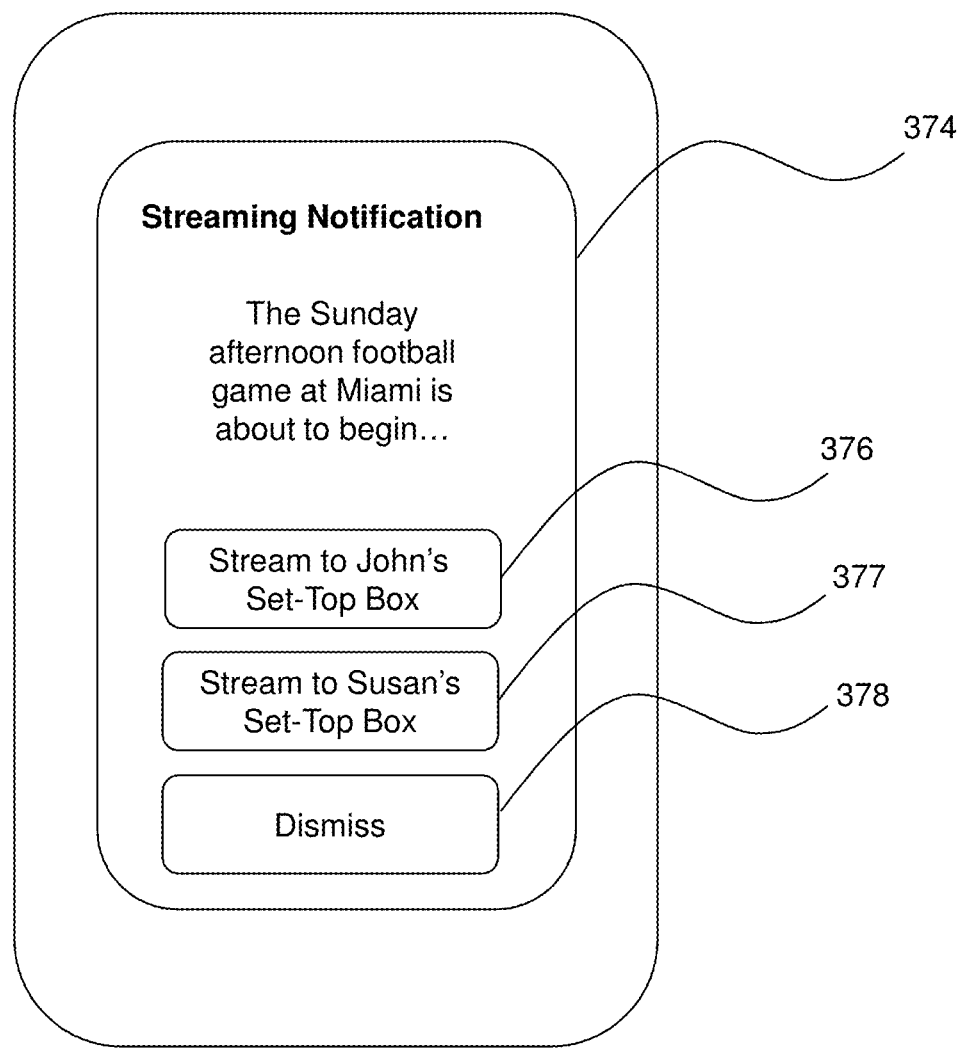
FIG. 3E depicts an illustrative embodiment of an end user device with a graphical user interface for media content streaming and reminder notifications.

FIG. 3E depicts an illustrative embodiment of an end user device with a graphical user interface for media content streaming and reminder notifications. As seen in this FIG., an end user device 370 (such as, for example, a smartphone) includes a display upon which graphical user interface 374 is presented. Graphical user interface 374 may include input element 376 (such as a button or the like) to cause media content to be streamed to a particular set-top box (in this example, to "John's set-top box). Further, graphical user interface 374 may include input element 377 (such as a button or the like) to cause media content to instead be streamed to a different set-top box (in this example, to "Susan's set-top box). Further still, graphical user interface 374 may include input element 378 (such as a button or the like) to dismiss the notification (without causing media content to be streamed to a set-top box).

As described herein, various embodiments provide for reminder notification and streaming of video content from a television service provider to a registered mobile device (e.g., based on prior selection through an electronic program presented by a television service provider's set-top box). In one example, a user registers a mobile device with the system to receive streaming video content. The user then views an EPG provided by the set-top box on a display device (e.g. television). The EPG lists a schedule of upcoming programs. The user selects an upcoming program to be streamed (e.g., to a user's mobile device). In another example, information regarding the selected program for streaming is transmitted to a network device (e.g. a media content server). At a predetermined time period prior to the start of the selected program, the system may send a notification to the user's registered mobile device indicating that streaming video content will begin at the start of the program. In another embodiment, the user may register a plurality of communication devices (e.g. mobile phones, smart watches, tablet computers, laptop computers, desktop computers, etc.) to receive streaming video content.

As described herein, various embodiments may use presence information to determine which one, or subset, of the plurality of communication devices is to receive the notification and/or streaming video content. For example, the user registers his or her laptop computer and mobile phone as candidate communication devices to receive selected streaming video content. In this example, the user has selected to stream certain video content at 10:00 am one morning. In this example, the user may be using his or her laptop computer at a coffee shop logged into a local WiFi network that morning. The user may also have his or her mobile phone on them while at the coffee shop. The system, using presence information, may determine that the user is logged in and working on his or her laptop but that his or her mobile phone is not in use (e.g., not using a cellular network and not using a WiFi network). Thus, in this example, the system may send the notification at 9:55 am (a predetermined time period prior to the start of the program) to the laptop and not to the mobile phone and then stream video content to the laptop starting at 10:00 am.

In another embodiment, the streaming video content may be associated with (e.g., sent to) any communication device (including, for example, third party communication devices) having a user profile that is associated with a particular user. For example, a user may be at a friend's house. The friend may have the same television service provider as the user. The friend's house may include a set-top box such that the user can place thereon or have placed thereon (such as, for example, via upload or download) the user's profile to the friend's set-top box (e.g., in view of permissions configured on the set-top box by the friend). In one specific example, the network device that provides the future streaming notifications and/or the network device that provides the media content receives confirmation from the friend's (i.e., third party's) set-top box and provides the future streaming notification and/or streaming video content to the friend's set-top box (e.g., to be presented on a display device communicatively coupled to the friend's set-top box).

As described herein, mechanisms are provided to enable a user to be away from their set-top box (e.g., away from their house) and still receive streaming media of live events. For example, a user may be walking in a park, camping in the woods, or otherwise away from his or her house and may nevertheless be enabled to view a live streaming event.

As described herein, mechanisms are provided to incorporate a streaming option (similar to recording/DVR options for shows, series, movies, etc.) into an EPG (e.g., a legacy EPG).

As described herein, streaming notifications and/or streaming of media content) may be sent to smart wearable devices, such as smart watches.

As described herein, linear content may be made streamable with user-friendly options. In another example, on-demand content may be made streamable with user-friendly options.

In another example, a notification sent to an end user device may include an indication (e.g., for display to the user) of the amount of time remaining until the start of the streaming.

In another example, a notification sent to an end user device may include a profile. In one specific example, the profile may be a replacement profile for enabling presentation of media content (e.g., streaming media content) at a set-top box.

As described herein, a user may seamlessly select the program(s) that he or she wishes to be streamed well in advance. A notification may be sent (e.g., a few minutes before the program begins). This can be particularly useful, for example, in cases of live sporting events (that is, games), as the users can watch their game anywhere that network coverage is available.

In another embodiment, a Universal Profile system may be utilized (e.g., to obtain information about various users' mobile device(s) and/or various users' set-top boxes). In one example, similar to GVH, a user's streaming list may be pushed to the HE systems as well. In another example, the streaming option can be applied to other shows/linear shows/VODs.

FIG. 4 depicts an illustrative embodiment of a first communication system 400 for media content streaming and reminder notifications. The communication system 400 can represent an Internet Protocol Television (IPTV) media system. Communication system 400 can be overlaid or operably coupled with system 100 of FIG. 1A and/or system 150 of FIG. 1B as another representative embodiment of communication system 400. For instance, one or more devices illustrated in the communication system 400 of FIG. 4 can function as a service provider server, a master server, a media content server, a subscriber mobile device and/or a subscriber set-top box.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. Such a web server can operate as and/or provide the functions of service provider server 102 of FIG. 1A. Further, such a web server can operate as and/or provide the functions of master server 152 of FIG. 1B and/or one or more of media content servers 154A, 154B and 154C of FIG. 1B.

Communication system 400 can also provide for all or a portion of the computing devices 430 to function as a service provider server (herein referred to as service provider server 430). The service provider server 430 can use computing and communication technology to perform function 462, which can include among other things, the media content streaming and reminder notification techniques described by method 200 of FIG. 2A, method 240 of FIG. 2B and/or method 270 of FIG. 2C. For instance, function 462 of server 430 can be similar to the functions described for servers 102, 152 and/or 154A-154C of FIGS. 1A and 1B in accordance with methods 200, 240 and/or 270. The media processors 406 and wireless communication devices 416 can be provisioned with software functions 464 and 466, respectively, to utilize the services of service provider server 430. For instance, functions 464 and 466 of media processors 406 and wireless communication devices 416 can be similar to the functions described for the communication devices 104A, 104B, 102A, 102B, 102C of FIG. 1A in accordance with methods 200, 240 and/or 270.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
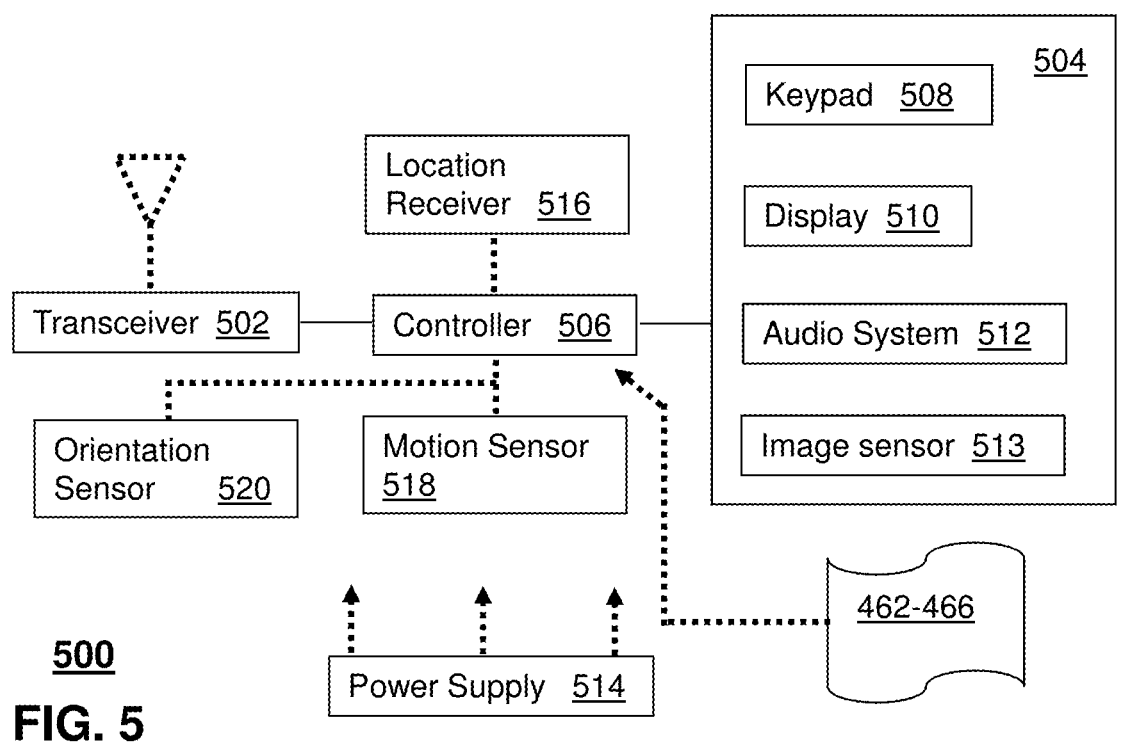
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1A, 1B, 3C, 3D, 3E and/or 4 and can be configured to perform portions of (or all of) method 200 of FIG. 2A, method 240 of FIG. 2B and/or method 270 of FIG. 2C.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices of FIGS. 1A, 1B, 3C, 3D and/or 3E, the media processor 406, the media devices 408, or the portable communication devices 416 of FIG. 4. It will be appreciated that the communication device 500 can also represent other devices that can operate in systems of FIGS. 1A and/or 1B and/or communication system 400 of FIG. 4 such as a gaming console and a media player. In addition, the controller 506 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, any desired number of media content servers may provide media content. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
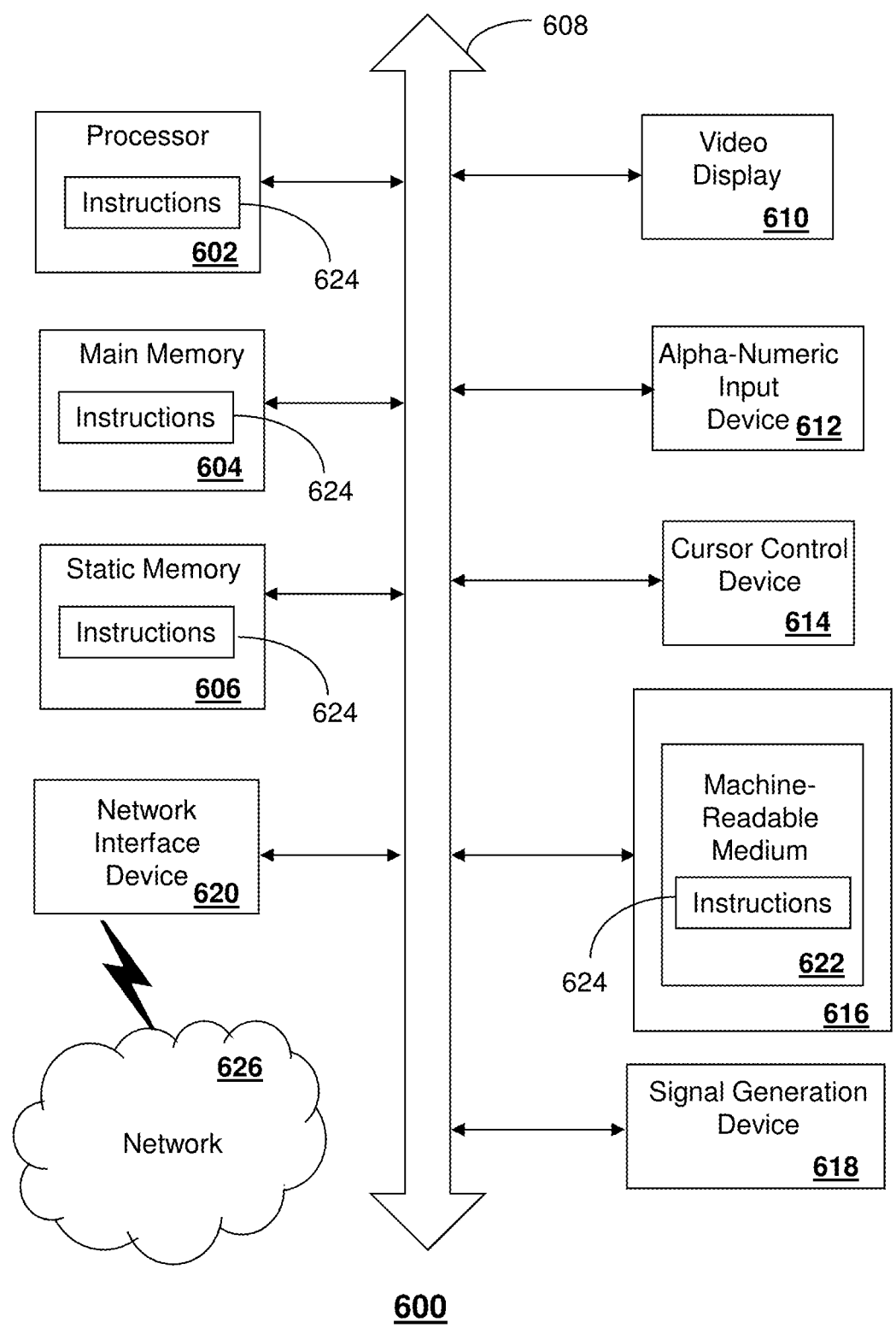
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the service provider server 430 and/or the media processor 406. One or more instances of the machine can operate, for example, as the service provider server 102, the mobile device 104A, the mobile device 104B, the set-top box 102A, the set-top box 102B and/or the set-top box 102C of FIG. 1A. One or more instances of the machine can operate, for example, as the master server 152, the media content server 154A, the media content server 154B and/or the media content server 154C of FIG. 1B. One or more instances of the machine can operate, for example, as the device 340 of FIG. 3C, device 350 of FIG. 3D and/or device 370 of FIG. 3E.

In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
a processor; and
a memory storing executable instructions that, when executed by the processor, perform operations comprising:
registering a first mobile device of a first subscriber as a first candidate device to receive a first notification indicating a future streaming of a media content item;
registering a second mobile device of the first subscriber as a second candidate device to receive the first notification indicating the future streaming of the media content item;
determining, responsive to the registering of the first mobile device, a first usage status of the first mobile device, wherein the first usage status is indicative of a first time period of usage for the first mobile device;
determining, responsive to the registering of the second mobile device, a second usage status of the second mobile device, wherein the second usage status is indicative of a second time period of usage for the second mobile device;
selecting one of the first and second mobile devices, based upon which of the first and second mobile devices has been most recently used, resulting in a selected mobile device;
receiving from the selected mobile device, responsive to the first notification, an indication of a first set-top box or a second set-top box as a selected set-top box to receive streaming of the media content item, wherein the first set-top box is associated with a second subscriber distinct from the first subscriber, and wherein the second set-top box is associated with a third subscriber distinct from the first subscriber;
responsive to receiving the indication, providing, to the selected set-top box, a replacement subscription profile associated with the first subscriber, wherein the replacement subscription profile enables the selected set-top box to present the media content item that is streamed to the selected set-top box;
sending to the selected mobile device, responsive to the selecting, a second notification indicating the future streaming of the media content item will begin;
receiving from the selected mobile device, responsive to the second notification, a streaming instruction to initiate the streaming of the media content item; and
streaming to the selected set-top box, responsive to the streaming instruction, the media content item.

2. The system of claim 1, wherein:
the first usage status indicates a most recent time that a first user interface of the first mobile device has been utilized;
the second usage status indicates a most recent time that a second user interface of the second mobile device has been utilized;

the first mobile device is selected as the selected mobile device in a case that the first mobile device had been most recently used; and
the second mobile device is selected as the selected mobile device in a case that the second mobile device had been most recently used.

3. The system of claim 2, wherein:
the first user interface is a first graphical user interface;
the first usage status indicates a most recent time that an input had been provided to the first graphical user interface;
the second user interface is a second graphical user interface; and
the second usage status indicates a most recent time that an input had been provided to the second graphical user interface.

4. The system of claim 1, wherein:
the first usage status indicates a most recent time that the first mobile device has been connected to a network;
the second usage status indicates a most recent time that the second mobile device has been connected to a network;
the first mobile device is selected as the selected mobile device in a case that the first mobile device had been most recently connected to a network; and
the second mobile device is selected as the selected mobile device in a case that the second mobile device had been most recently connected to a network.

5. The system of claim 1, wherein:
the first usage status indicates that the first mobile device is connected to a network;
the second usage status indicates that the second mobile device is not connected to a network; and
the first mobile device is selected based upon the first mobile device being connected to a network and the second mobile device not being connected to a network.

6. The system of claim 1, wherein:
the determining the first usage status of the first mobile device comprises sending a first usage status query to the first mobile device, wherein the first time period of usage for the first mobile device comprises a current time; and
the determining the second usage status of the second mobile device comprises sending a second usage status query to the second mobile device, wherein the second time period of usage for the second mobile device comprises the current time.

7. The system of claim 6, wherein:
the determining the first usage status of the first mobile device comprises receiving from the first mobile device, responsive to the first usage status query, a first usage status response; and
the determining the second usage status of the second mobile device comprises receiving from the second mobile device, responsive to the second usage status query, a second usage status response.

8. The system of claim 1, wherein:
the registering the first mobile device comprises storing, in a database, a first network address of the first mobile device; and
the registering the second mobile device comprises storing, in the database, a second network address of the second mobile device.

9. The system of claim 1, wherein:
the registering the first mobile device comprises storing, in a database, a first telephone number of the first mobile device; and
the registering the second mobile device comprises storing, in the database, a second telephone number of the second mobile device.

10. The system of claim 1, wherein the operations further comprise receiving an indication of how long before a start of streaming of the media content item the second notification should be sent.

11. The system of claim 1, wherein each of the first and second mobile devices comprises one of a smartphone, a tablet, a laptop computer, a smart watch or any combination thereof.

12. A non-transitory machine-readable storage medium comprising executable instructions that, when executed by a processing system including a processor, perform operations comprising:
registering a first mobile device of a first subscriber to receive a notification of a future streaming of a media content item;
registering a second mobile device of the first subscriber to receive the notification of the future streaming of the media content item;
registering a first set-top box of a second subscriber as a first candidate device to receive the media content item, wherein the second subscriber is distinct from the first subscriber;
registering a second set-top box of a third subscriber as a second candidate device to receive the media content item, wherein the third subscriber is distinct from the first subscriber, and wherein the third subscriber is distinct from the second subscriber;
determining which of the first and second mobile devices has been most recently used;
selecting, one of the first and second mobile devices, based upon which of the first and second mobile devices has been most recently used, resulting in a selected mobile device;
sending to the selected mobile device the notification that the streaming of the media content item will begin;
receiving from the selected mobile device, responsive to the sending of the notification, an indication of either the first candidate device to receive the streaming of the media content item or the second candidate device to receive the streaming of the media content item, wherein the indication indicates a selected set-top box;
responsive to receiving the indication, providing, to the selected set-top box, a replacement subscription profile associated with the first subscriber, wherein the replacement subscription profile enables the selected set-top box to present the media content item that is streamed to the selected set-top box; and
streaming to the selected set-top box, responsive to the selection, the media content item.

13. The non-transitory machine-readable storage medium of claim 12, wherein:
the registering the first set-top box comprises storing in a database an identification of the first set-top box using an identifier of the first set-top box, an identifier of the second subscriber, or a combination thereof; and
the registering the second set-top box comprises storing in the database an identification of the second set-top box using an identifier of the second set-top box, an identifier of the third subscriber, or a combination thereof; and the registering the first set-top box and the registering the second set-top box are performed via a subscriber set-top box of the first subscriber.

14. The non-transitory machine-readable storage medium of claim 12, wherein the replacement subscription profile replaces, on the selected set-top box, an existing subscription profile associated with one of the second subscriber and the third subscriber.

15. The non-transitory machine-readable storage medium of claim 12, wherein:
the registering the first and second mobile devices comprises storing in a database an identification of the first and second mobile devices using an identifier of the first and second mobile devices, an identifier of the first subscriber, or a combination thereof;
the registering the first and second mobile devices is performed via a subscriber set-top box of the first subscriber; and
the first and second mobile devices each comprise a smartphone, a tablet, a laptop computer, a smart watch or any combination thereof.

16. A method comprising:
registering a first mobile device of a first subscriber as a first candidate device to receive a first notification indicating a future streaming of a media content item;
registering a second mobile device of the first subscriber as a second candidate device to receive the first notification indicating the future streaming of the media content item;
determining which of the first and second mobile devices has been most recently used;
selecting, one of the first and second mobile devices, based upon which of the first and second mobile devices has been most recently used, resulting in a selected mobile device;
sending to the selected mobile device, responsive to the selecting, a second notification indicating the future streaming of the media content item will begin;
receiving from the selected mobile device, responsive to the second notification, an indication of a first set-top box or a second set-top box as a selected set-top box to receive streaming of the media content item, wherein the first set-top box is associated with a second subscriber distinct from the first subscriber, and wherein the second set-top box is associated with a third subscriber distinct from the first subscriber;
responsive to receiving the indication, providing to the selected set-top box, a replacement subscription profile associated with the first subscriber, wherein the replacement subscription profile enables the selected set-top box to present the media content item that is streamed to the selected set-top box;
receiving from the selected mobile device, responsive to the second notification, a streaming instruction to initiate the streaming of the media content item; and
streaming to the selected set-top box, responsive to the streaming instruction, the media content item.

17. The method of claim 16, wherein the wherein the selecting further includes selecting the first mobile device as the selected mobile device in a case that the first mobile device had been most recently used and selecting the second mobile device as the selected mobile device in a case that the second mobile device had been most recently used.

18. The method of claim 16, further comprising receiving an indication of how long before a start of streaming of the media content item the second notification should be sent.

19. The method of claim 16, wherein each of the first and second mobile devices comprises one of a smartphone, a tablet, a laptop computer, a smart watch or any combination thereof.

* * * * *